INVENTORS
LOWELL D. AMDAHL
WEAVER T. BRIAN, JR.
ALFRED D. SCARBROUGH
EDWARD J. SCHNEBERGER
RALPH J. KOERNER
Arthur Freilich
ATTORNEY INVENTORS
LOWELL D. AMDAHL
WEAVER T. BRIAN, JR.
ALFRED D. SCARBROUGH
EDWARD J. SCHNEBERGER
RALPH J. KOERNER
BY Arthur Frelich
ATTORNEY

MODULAR COMPUTER SYSTEM

INVENTORS
LOWELL D. AMDAHL
WEAVER T. BRIAN, Jr.
ALFRED D. SCARBROUGH
EDWARD J. SCHNEBERGER
RALPH J. KOERNER
BY Arthur Freilich
ATTORNEY United States Patent Office 3,226,688
Patented Dec. 28, 1965

3,226,688

MODULAR COMPUTER SYSTEM

Lowell D. Amdahl, Weaver T. Brian, Jr., and Alfred D. Scarbrough, Northridge, and Edward J. Schneberger and Ralph J. Koerner, Canoga Park, Calif.; said Amdahl, Brian, Scarbrough, and Schneberger assignors, by mesne assignments, to The Bunker-Ramo Corporation, Stamford, Conn., a corporation of Delaware Filed July 3, 1961, Ser. No. 121,593
6 Claims. (Cl. 340—172.5)

This invention relates generally to computer systems and more particularly to a computer system characterized by its modular organization.

The typical organization of conventional computer systems uses a digital computer as a central element with all peripheral devices under the exclusive control of the central computer. In a few known systems, certain minor control functions are delegated to peripheral devices, but the fundamental system control always resides in the central computer. It is basic to this type of organization that the system capacity, size, speed, and reliability must be limited by the central computer and that system growth capability is restricted to modifying the peripheral equipment. For this reason, the computer art has developed principally in terms of larger and faster digital computers.

In contrast to the development in the art, the invention herein introduces an improved computer system, not characterized by a larger and faster digital computer, but instead by a modular organization. The essence of the invention lies in the fact that system control is distributed or decentralized rather than committed to an indivisible central computer so that capacity, size, speed, and reliability of the system are not limited by a single unit.

Accordingly, it is an object of this invention to provide a computer system which is more reliable, more flexible, and more easily expandable than known systems.

It is a further object of this invention to provide a computer system in which multiples of basic devices designated "modules," may be organized in different arrangements to offer the maximum total capability for the equipment involved.

It is a still further object of this invention to provide a computer system in which each of a plurality of modules, designated "controlling" modules, has communication access to each of a plurality of modules, designated "controlled" modules.

It is a still further object of this invention to provide a computer system in which several communication paths between modules may be concurrently maintained, each path linking a controlling module with a controlled module.

Briefly, the invention herein introduces a computer system organization wherein a communication network designated an "exchange," is utilized as the central element. The exchange permits a plurality of controlling modules, devices operating under their own stored program, to have access to all the data stored in the system and permits each of these controlling modules to maintain simultaneous communication with a controlled module. Thus, the system permits the simultaneous solution of many different problems or the simultaneous partial solutions of a large problem.

More particularly, the computer system discussed herein includes controlling modules, controlled modules and an exchange. The controlling modules are devices, such as computers or buffers, capable of executing their own stored programs which may include commands requesting that a connection be established with a particular controlled module. The controlled modules include storage devices such as drum and tape units and input/output equipment such as display devices, printers, plotters, etc. The exchange may be considered as comprised of two distinct sections; namely, a first section including a number of sense units and a second section consisting of normally open information channels between each controlling module and each controlled module. Under the direction of a controlling module, the exchange sense units recognize an output signal from the controlling module as a request that a connection be made between it and an addressed controlled module. The sense units then act to close the normally open information channels between the requesting controlling module and the addressed controlled module.

Use of the modular organization introduced herein provides certain significant advantages over the conventional computer systems known in the prior art. Inasmuch as several controlling modules having arithmetic capabilities can be simultaneously connected to controlled modules through the exchange, simultaneous arithmetic operations can be effected so that solutions to complex problems may be obtained extremely fast. The maintenance of different simultaneous communication paths also provides greater flexibility than heretofore possible in the application of the equipment to diverse problems. Moreover, the utilization of a multiplicity of smaller modules, rather than a single large unit, permits a user to match his system equipment with his present needs and expand his equipment and capabilities in small increments as his needs grow. Therefore, the risk of initial equipment waste or early obsolescence is obviated. Whereas in conventional systems, the central computer limits the reliability of the entire system, modularity permits decentralization resulting in increased reliability inasmuch as a single module failure cannot disable the entire system. It is contemplated that each module be self-contained; that is, provided with its own power supply, fan, etc. Summarizing, the modular computer system organization presented herein offers improvements in flexibility, expandability and reliability.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

Figure 1:
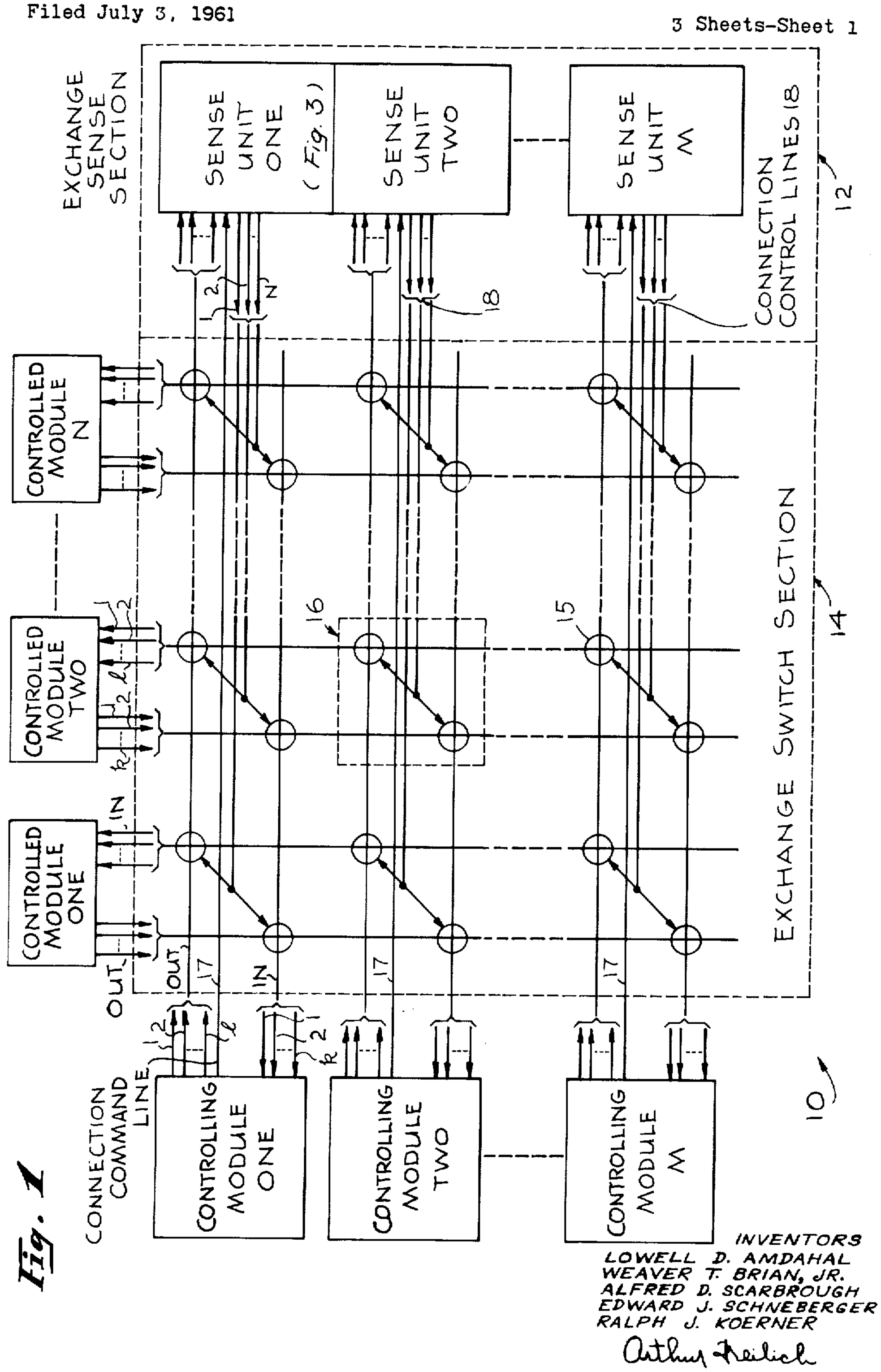
FIGURE 1 is a block diagram of the invention illustrating a generalized system organization including M controlling modules and N controlled modules.

With continuing reference to the drawings, initial attention is directed to FIGURE 1 wherein is illustrated the generalized computer system organization comprising the present invention. The system includes M controlling modules and N controlled modules. Controlling modules comprise devices such as computers and buffers (i.e., computers not having arithmetic capability) capable of operating under their own stored program to issue commands requesting connection with controlled modules while controlled modules may, e.g., constitute transitional storage devices such as magnetic drums, file storage devices such as tape units, input devices such as tape readers and output devices such as printers. The controlling modules are each provided with $l$ output lines and $k$ input lines while the controlled modules are each provided with $k$ output lines and $l$ input lines. As is well known in digital techniques, information is represented on these lines by the establishment thereon of one of two possible discrete voltage levels; e.g., a high voltage level may be representative of a "1" or a true condition and a low voltage level may be representative of a "0" or a false condition.

The system organization contemplates the interconnection of any one of the M controlling modules with any one of the N controlled modules in response to a programmed command of the former. For this purpose, the exchange 10 is provided and includes first and second sections; namely, the sense section 12 and the switch section 14.

The switch section 14 comprises a plurality of normally open information channels and for exemplary purposes is illustrated as a matrix arrangement including a plurality of intersecting electrical conductors defining crosspoints with normally open interconnecting means (as represented by circles 15) at each crosspoint. The M controlling modules may be considered as being connected to the switch section along a vertical axis and the N controlled modules along a horizontal axis. Inasmuch as the exchange is intended to permit communication between any of the M controlling modules and any of the N controlled modules, a set of crosspoints 16 for each possible paired combination must be provided or in other words, a total of (MN) sets of crosspoints. Each set of crosspoints must necessarily include $(l+k)$ crosspoints to permit two-way information flow between paired modules.

The exchange sense section 12 comprises M sense units with each of the sense units connected to and serving a different one of the M controlling modules. The $l$ output lines from a controlling module, as e.g., controlling module one are connected to sense unit one and may be used to carry signals comprising an address corresponding to a particular position on the switch section horizontal axis. Each controlled module is connected to the switch section 14 at a particular position on its horizontal axis while each controlling module is connected at a particular position on its vertical axis. In addition to the $l$ output lines and $k$ input lines, each controlling module has a connection command line 17 which connects it to its sense unit. N connection control lines 18 extend from each sense unit with each being uniquely connected to a particular set of crosspoints 16.

Figure 2:
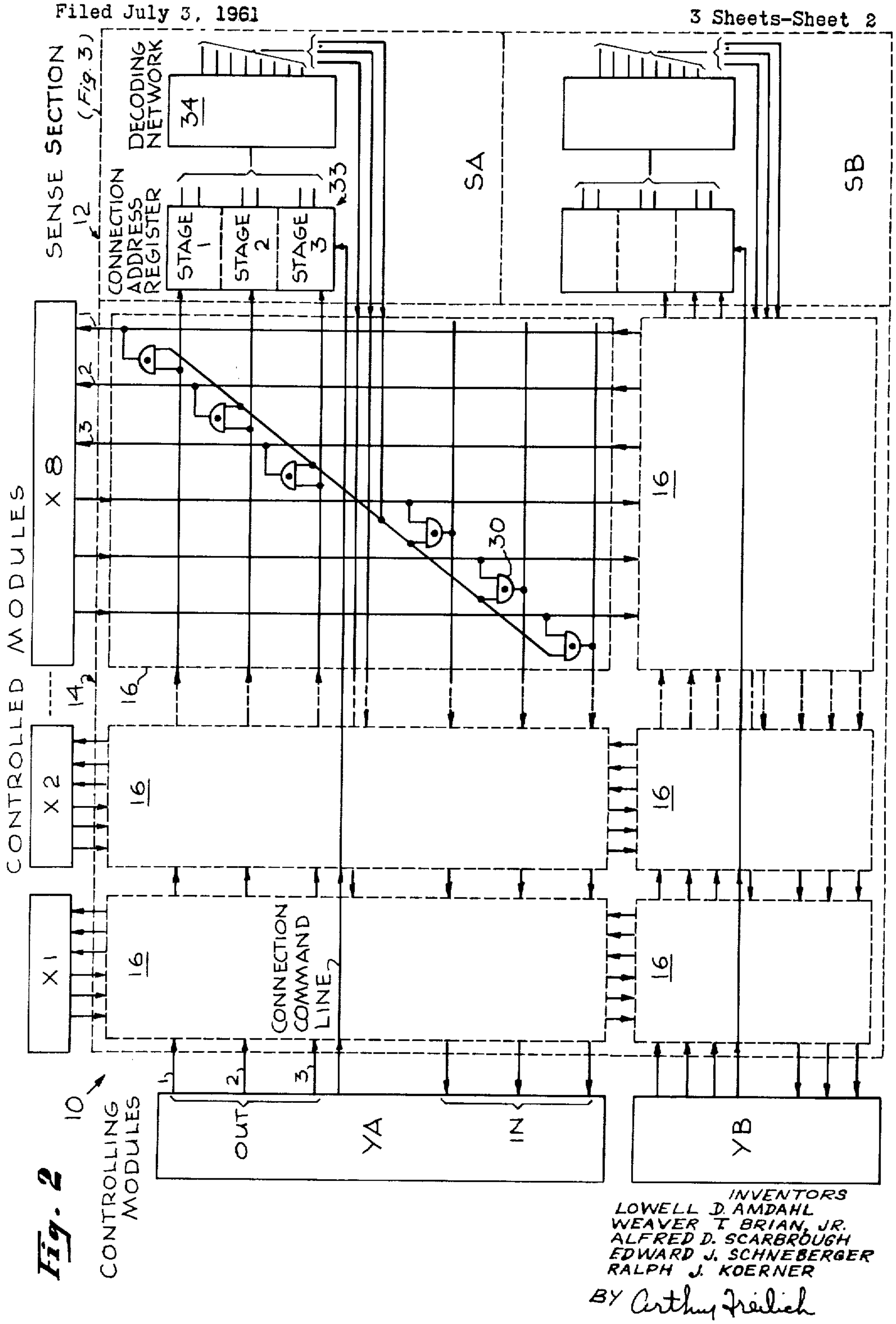
FIGURE 2 is a block diagram of a specific system organization including two controlling modules and eight controlled modules.

Attention is now called to FIGURE 2 wherein a specific modular organization, including two controlling modules YA, YB and eight controlled modules X1–X8, is illustrated. Since each controlling module must be able to communicate with each controlled module, all modules must be standardized with respect to their information handling capabilities. For the sake of simplicity in explanation, the information format utilized will comprise information transfers between modules in words three bits in length. Accordingly, each of the modules is provided with three output lines and three input lines. In addition, each of the controlling modules YA, YB has a connection command line extending therefrom and connecting to its sense section.

Switch section 14 comprises a matrix arrangement formed by a plurality of conductors interconnected by "and" gates 30. Each of the output lines from each module is connected to a switch section conductor which forms a first input to an "and" gate 30 while each of the input lines to each module is connected to a switch section conductor which comprises the output of an "and" gate 30. The switch section 14 may be considered as having two axes to which modules may be connected; that is the vertical or Y axis to which controlling modules YA, YB are connected and the horizontal or X axis to which controlled modules X1–X8 are connected. Information transfer between output and input lines is controlled by controlling a second input to each of "and" gates 30. In order to effect information flow between a pair of modules, the second inputs to the six "and" gates, comprising normally open interconnecting means for a set of crosspoints 16 interconnecting the input and output lines of the module pair, are all made true. Accordingly if the second input is true, the information represented by the level on the first input is transferred to the output.

Figure 3:
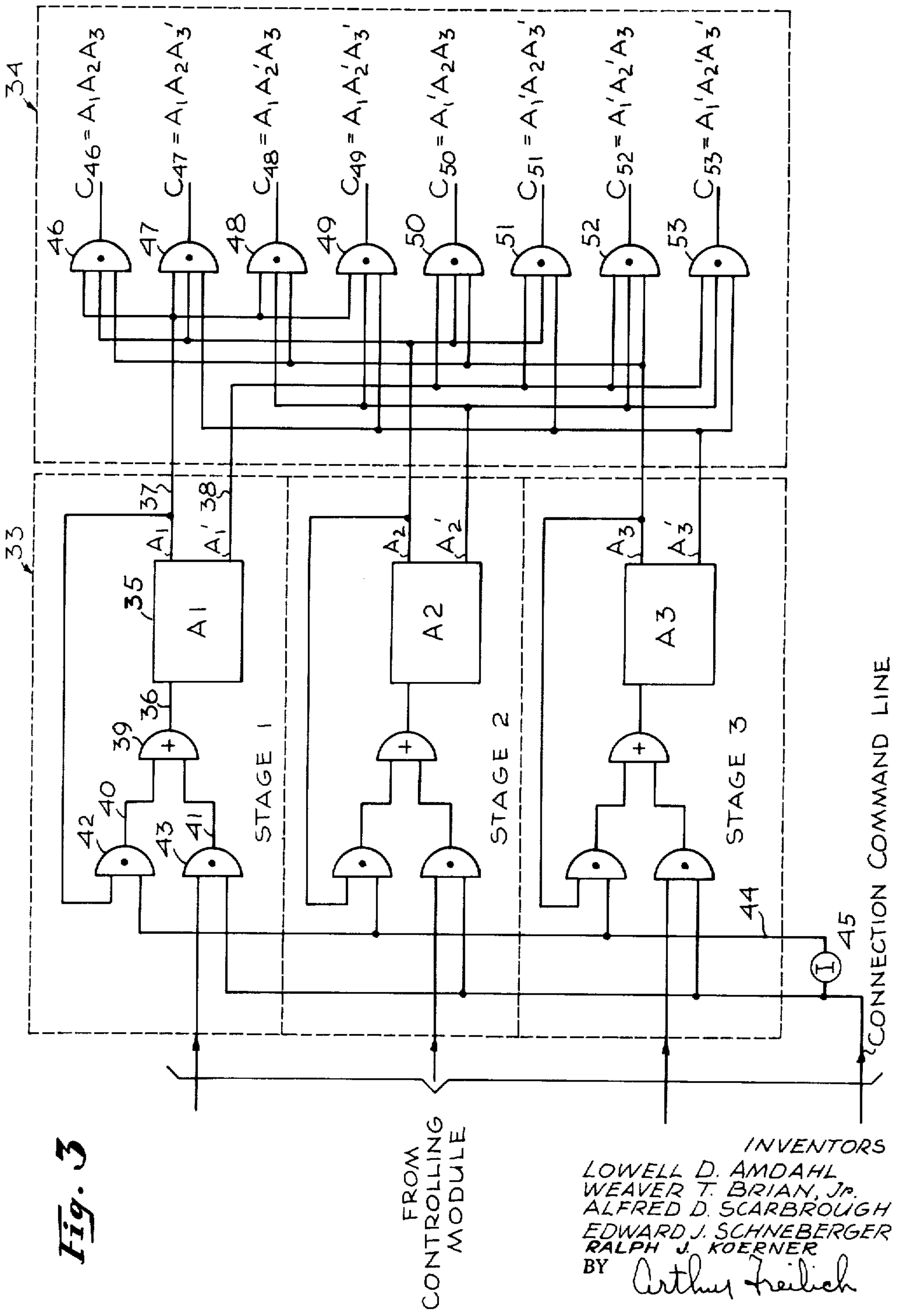
FIGURE 3 is a schematic diagram illustrating the details of one of the sense units of FIGURE 2.

In order to control the second inputs to a set of "and" gates for affecting information transfer between a controlled and a controlling module at the command of the latter, sense units SA, SB are provided. The sense units SA, SB are connected respectively to the controlling modules YA, YB through the connection command lines and controlling module output lines. The sense units SA, SB are identical to each other and therefore the details of only sense unit SA are illustrated in FIGURE 3. Each sense unit performs the function of recognizing a connection command from the controlling module to which it is connected and in turn setting true the appropriate connection control line which is connected to the second inputs of the set of "and" gates which interconnect the controlling module lines with the lines of the controlled module uniquely associated with the connection command.

Each sense unit SA, SB includes a connection address register 33 and a connection address decoding network 34. The register 33 comprises three identical stages with each of the three controlling module output lines connected to a different stage. Each stage is formed with a delay flip-flop 35 having a single input terminal 36 and a pair of complementary output terminals 37, 38. This type of delay flip-flop is well known in the art and functions to provide a true level output on terminal 37 and a complementary false level output on terminal 38 as long as the input level on terminal 36 is true. If the input level goes false, after a predetermined time delay, the output condition will reverse; that is a true level will be applied to terminal 38 and a false level to terminal 37. In the former condition the flip-flop is said to be true while in the latter, it is said to be false.

Input terminal 36 is connected to the output of "or" gate 39 having inputs 40, 41 connected to the outputs of "and" gates 42, 43 respectively. The inputs to "and" gate 43 comprise the connection command line and one of the three controlling module output lines. The inputs to "and" gate 42 comprise line 44, which is connected through inverter 45 to the connection command line, and flip-flop output terminal 37.

A connection command from any controlling module YA, YB is defined as one which sets its connection command line true and applies an address, corresponding to a position on the horizontal axis (X-axis) of the switch section, on its output lines. Each address that a controlling module YA, YB is capable of generating is in correspondence with no more than one position on the horizontal axis and of course only one of the controlled modules X1–X8 may be connected at each position.

Therefore, when the stored program of one of the controlling modules YA, YB dictates that a connection be made between it and a particular controlled module, the signal on its connection command line is set true and a signal representing an address is applied to its three output lines. Inasmuch as the connection command line and one controlling module output line are paired and connected as inputs to "and" gates 43 of each of the three stages of the register 33, the "or" gate 39 input 41 will be true only if the signal on the connected controlling module output line is true. Whenever the signal on the connection command line is true, the signal on line 44 is of course false and therefore "or" gate 39 input 40 will be false. It is therefore apparent that the signal on flip-flop input terminal 36 is true and flip-flop 35 is set true only if the signal on the connected controlling module output line is true while the signal on the connection command line is true. When the connection command signal is removed from the controlling module lines, the flip-flops 35 will remain as set inasmuch as the signal line 44 will then be true so as to apply a true level to input terminal 36 if the flip-flop 35 is true as manifested by the level on terminal 37.

Connected to the connection address register 33 is the connection address decoding network 34 whose output control the previously mentioned second inputs of the sets of "and" gates which interconnect the controlling and controlled module lines. For a given address in the register 33, the decoding network 34 will cause, at most, one of its eight output lines, constituting connection control lines, to become true.

The decoding network 34 includes eight "and" gates 46–53 each of which has a unique input formed from the outputs of the flip-flops 35 of the three stages of register 33.

If the flip-flops 35 of stages 1, 2 and 3 of register 33 are designed as A1, A2, and A3, respectively, the complementary output voltages on terminals 37 and 38 may be designated as $A_1$, $A_1'$; $A_2$, $A_2'$; and $A_3$, $A_3'$ and the input signals necessary to trigger the flip-flops true as 1*a*1, 1*a*2, and 1*a*3, respectively. The following logical equations then represent the operation of the flip-flops:

$$1a1=A_1G'+O_1G$$
$$1a2=A_2G'+O_2G$$
$$1a3=A_3G'+O_3G$$

where $O_1$, $O_2$, $O_3$ are the signals on the three controlling module output lines, representing a horizontal axis position address, and G is the signal on the connection command line. The equations mean that the flip-flop is set true if it already is true and the signal on the connection command line is false or if the controlling module output line with which it is associated is true.

The logical equations associated with each of the "and" gates 46–53 in FIGURE 3 wherein, e.g., "C46" represents the true level on the output of "and" gate 46, describes the function of each gate.

The output of each gate of the network 34 is connected to a different set of "and" gates which interconnect the controlling and controlled module lines. Accordingly, connection between a controlling module YA, YB and one of the controlled modules X1–X8 depends on the address placed in the register 33 associated with the controlling module.

From the foregoing it should be appreciated that applicants have disclosed herein a computer system in which modules operating under their own stored program are able to effect the establishment of communication paths between themselves and other modules such as storage devices and input/output equipment. The means for establishing the paths permit several different paths to be simultaneously maintained so that the system is capable of working on several problems or on different parts of the same problem simultaneously. Inasmuch as the system permits all controlling modules to have equal access to the controlled modules maximum capability is obtainable from the equipment used. Also, because the system employs a multiplicity of relatively small units rather than a single large one, a user may more accurately match his equipment to his present needs and increase system capability in small increments as needs grow. Further the system herein is more reliable than known systems because component failures are likely to render inoperative only certain modules and certain communication paths whereas similar failures in other systems would result in a total loss of capability.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The following is claimed as new:

1. A modular computer system including a plurality of programmable controlling modules and including a plurality of controlled modules; an exchange for selectively connecting any one of said controlling modules, in response to a programmed connection command therefrom, to any specific one of said controlled modules comprising: a set of controlled module conductors connected to each controlled module; a set of controlling module conductors connected to each controlling module; normally opened means interconnecting each set of controlled module conductors with each set of controlling module conductors; sense means connected to each set of controlling module conductors for recognizing connection commands thereon; connection control means connected to said sense means and responsive thereto for closing the interconnecting means between the set of conductors connected to a commanding controlling module and the set of conductors connected to a selected control module; said sense means including a decoding network; said connection control means being responsive to the output of said decoding network and including a plurality of connection control lines each of which extends to a different one of said interconnecting means.

2. The combination of claim 1 wherein said interconnecting means comprise an "and" gate having as its inputs a connection control line and either a controlled or controlling module conductor.

3. A data processing system comprising: a plurality of stored program controlling modules; a plurality of controlled modules; each of said controlling modules capable of providing a plurality of different connection command signals each of which is identifiable with one of said controlled modules; and interconnecting means responsive to each signal for establishing a communication path between the controlling module providing said signal and the controlled module with which said signal is identifiable; said interconnecting means including a sense unit and a plurality of normally open information channels interconnecting each controlling module with each controlled module; said sense unit comprising register means for storing said signals and decoding means for energizing the one line of a plurality of connection control lines, uniquely associated with the stored signal; and logical means coupled to the one line for closing the normally open information channel interconnecting the controlling module providing said stored signal and the controlled module with which said signal is identifiable to establish said communication path.

4. The combination of claim 3 wherein said logical means comprise an "and" gate having as an input said one line.

5. A modular processing system comprising an exchange including first and second groups of conductors, normally open means interconnecting each conductor of said first group with each conductor of said second group, sense means connected to said first group of conductors and responsive to signals thereon for closing the means interconnecting selected conductors of said first and second groups; controlled modules; controlling modules capable of providing said signals, each of said controlled modules connected to said second group of conductors, each of said controlling modules connected to said first group of conductors; said sense means including a decoding network having a plurality of output lines, each of said output lines controlling means interconnecting a different pair of conductors of said first and second groups.

6. The combination of claim 5 wherein said interconnecting means between conductors of said first and second groups comprise a logical "and" gate having as its inputs one of said output lines and a conductor of said first group.

References Cited by the Examiner

UNITED STATES PATENTS

| | | | |
|---|---|---|---|
| 2,283,999 | 5/1942 | Kozma et al. | 235—150 |
| 2,528,101 | 10/1950 | Williams | 235—61.6 |
| 2,538,636 | 1/1951 | Williams | 235—61.6 |
| 2,588,923 | 3/1952 | Hatton | 235—157 |
| 2,813,929 | 11/1957 | Oberman | 179—18 |
| 2,910,238 | 10/1959 | Miles et al. | 235—157 X |

OTHER REFERENCES

Bloch: "The Engineering Design of the Stretch Computer," Proceedings of the Eastern Joint Computer Conference, pages 48 to 58, Dec. 1–3, 1959.

Eckert et at.:"Design of Univac-LARC System: 1," Proceedings of the Eastern Joint Computer Conference, pages 59 to 65, Dec. 1–3, 1959.

ROBERT C. BAILEY, *Primary Examiner.*

WALTER W. BURNS, Jr., MALCOLM A. MORRISON, *Examiners.*